United States Patent [19]
Klaiber et al.

[11] 3,946,054
[45] Mar. 23, 1976

[54] KETO-ESTER COMPOSITION

[75] Inventors: Erich Manfred Klaiber, Neptune; Alan Owen Pittet, Atlantic Highlands, both of N.J.

[73] Assignee: International Flavors & Fragrances Inc., New York, N.Y.

[22] Filed: Dec. 30, 1974

[21] Appl. No.: 537,591

Related U.S. Application Data

[62] Division of Ser. No. 471,756, May 20, 1974, Pat. No. 3,873,574.

[52] U.S. Cl. ........... 260/408; 260/410.9 R; 260/483
[51] Int. Cl.[2] ........................................... C09F 7/00
[58] Field of Search ............. 260/410.9 R, 408, 483

[56] References Cited

UNITED STATES PATENTS

| | | | |
|---|---|---|---|
| 3,027,401 | 3/1962 | Reicheneder | 260/483 |
| 3,842,126 | 10/1974 | Erby | 260/483 |

FOREIGN PATENTS OR APPLICATIONS

| | | | |
|---|---|---|---|
| 643,891 | 8/1964 | Belgium | 260/343.5 |

OTHER PUBLICATIONS

Chemical Abstracts, 75:76093b.
Chemical Abstracts, 58:12508d.

*Primary Examiner*—Winston A. Douglas
*Assistant Examiner*—John F. Niebling
*Attorney, Agent, or Firm*—Arthur L. Liberman; Harold Haidt

[57] ABSTRACT

A process is described for the preparation of 6-alkyl-alpha-pyrones which comprises the steps of:

i. acylating an alkyl-3-butenoate ester having the formula:

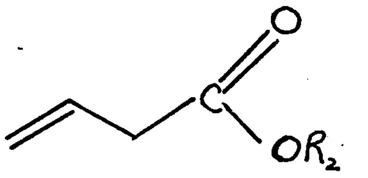

with an acylating agent having the formula:

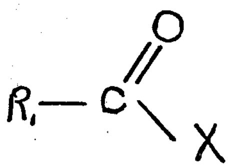

in the presence of a Friedel-Crafts catalyst to produce a novel mixture of two ketoesters having the formulae:

(A)

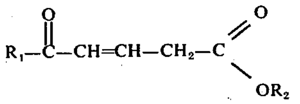

and (B)

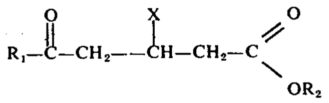

ii. optionally separating said mixture into its individual keto-esters;

iii. contacting said mixture of keto-esters or one of the individual components thereof with a solid, heat resistant catalyst such as copper, stainless steel, nickel or stone at a temperature in the range of from about 450°C up to about 600°C, thereby forming a 6-alkyl-alpha-pyrone having the formula:

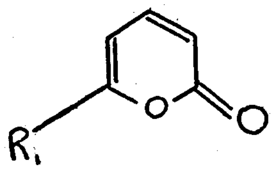

wherein $R_1$ is $C_1$–$C_{10}$ alkyl, $R_2$ is lower alkyl and X is chloro or bromo.

Claimed herein is said mixture of keto-esters as well as each of the individual components thereof.

8 Claims, 1 Drawing Figure

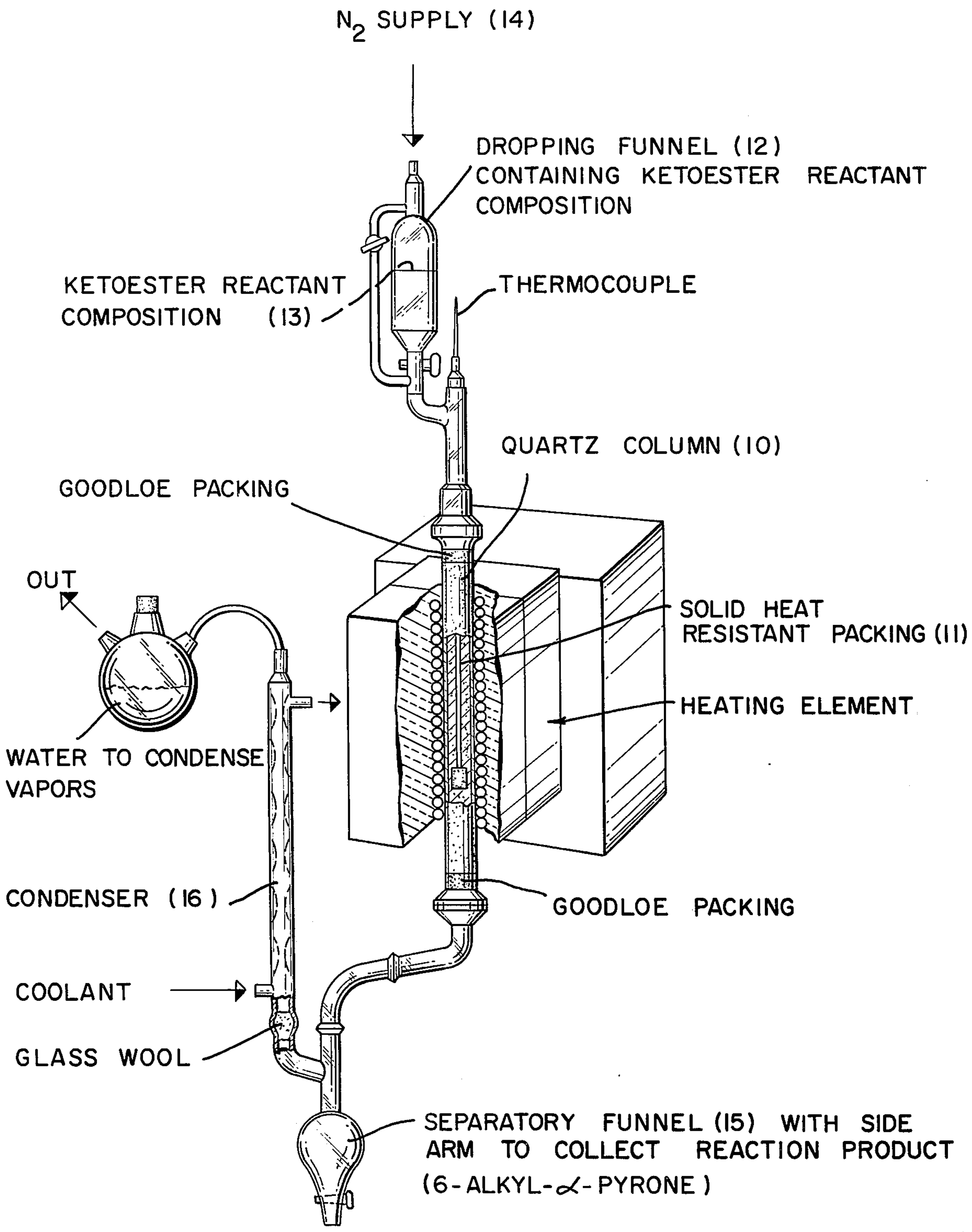
$N_2$ SUPPLY (14)
DROPPING FUNNEL (12) CONTAINING KETOESTER REACTANT COMPOSITION
KETOESTER REACTANT COMPOSITION (13)
THERMOCOUPLE
QUARTZ COLUMN (10)
GOODLOE PACKING
OUT
SOLID HEAT RESISTANT PACKING (11)
HEATING ELEMENT
WATER TO CONDENSE VAPORS
CONDENSER (16)
GOODLOE PACKING
COOLANT
GLASS WOOL
SEPARATORY FUNNEL (15) WITH SIDE ARM TO COLLECT REACTION PRODUCT (6-ALKYL-α-PYRONE)

KETO-ESTER COMPOSITION

This application is a division of applicants' copending application Ser. No. 471,756 filed on May 20, 1974 now U.S. Pat. No. 3,873,574 issued on Mar. 25, 1975.

BACKGROUND OF THE INVENTION 6-alkyl-alpha-pyrones are valuable substances useful in the formulation of perfumery, tobacco and food flavoring materials, as disclosed in copending application for U.S. Letters Pat. No. 471,755 filed on May 20, 1974 and copending application for U.S. Letters Pat. No. 471,785 filed on May 20, 1974. Nobuhara, *Agr. Biol. Chem.* 1969; 33, No. 9, 1264–9 (Title: "Synthesis of Unsaturated Lactones/III, Flavorous Nature of Some δ-Lactones having the Double Bond at Various Sites") indicates the waxy, buttercake flavor of 6-pentyl-alpha-pyrone (pg. 1267, col. 1). In addition, the flavor attributes of 6-alkyl-alpha-pyrones, in general, are discussed. Sevenants, *J. Food Sci.* 1971, 36 (3) 536 discloses the occurrence of 6-pentyl-alpha-pyrone in peach aroma.

The preparation of 6-alkyl-alpha-pyrones is set forth in several references, to wit: a. Lohaus, *Chemische Berichte*, 100, 658 (1967) discloses a reaction as follows:

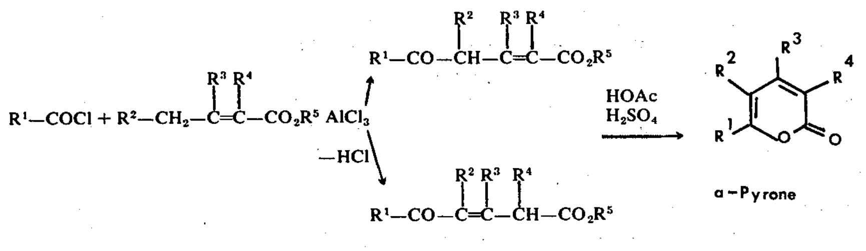

wherein $R^1$, $R^3$ and $R^5$ are the same or different alkyl and $R^2$ and $R^4$ are hydrogen or alkyl.

As is indicated in Example I, infra, the yield of 6-alkyl-alpha-pyrones without other ring substituents obtained in carrying out the Lohaus et al. reaction sequence is so low as to cause this process to be commercially impractical.

The Nobuhara paper, cited supra, discloses a multi-step synthesis which gives rise to less than a 10% yield of 6-alkyl-alpha-pyrone, thusly:

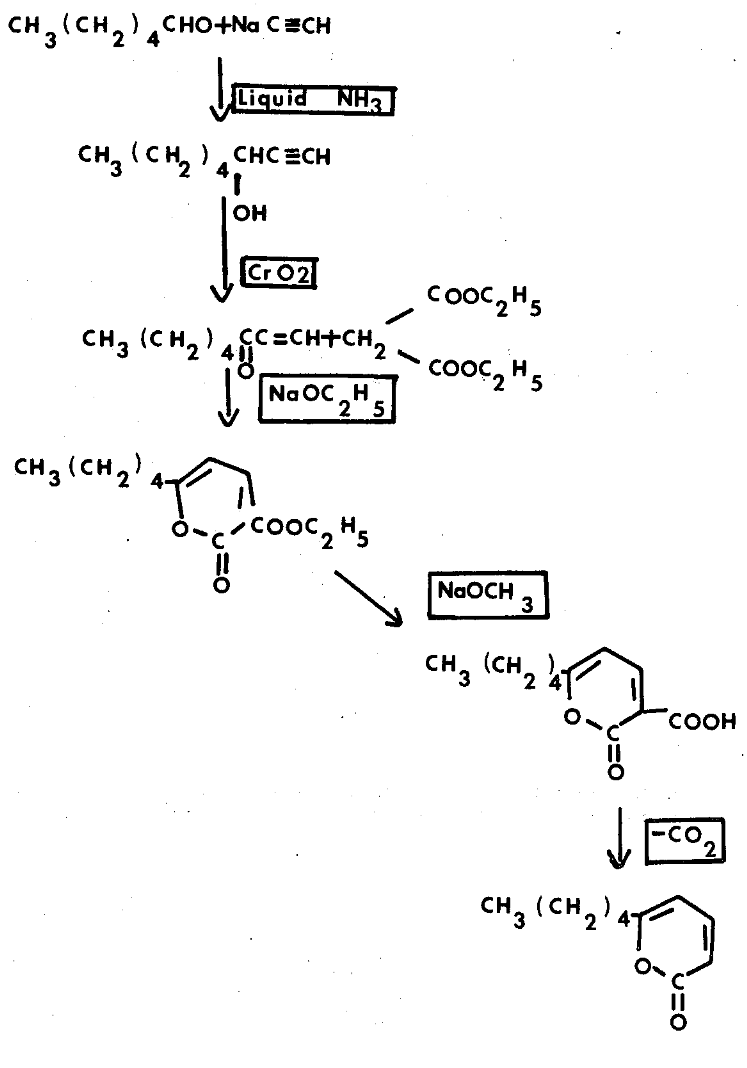

The multi-step sequence of reactions and the low yield of final product render the Nobuhara synthesis commercially impractical.

THE INVENTION

This invention comprises a novel reaction intermediate, a mixture of keto-esters, as well as each of the two individual components thereof.

Briefly, the process wherein such mixture of keto-esters or one of the components of such mixture is a reaction intermediate comprises a reaction carried out in two steps, the first of which is a Friedel-Crafts reaction of an acyl halide with an alkyl-3-butenoate ester to form a novel mixture of keto-esters and, secondly, lactonizing the resultant mixture of keto-esters preferably but not necessarily in the presence of an inert liquid diluent at high temperatures in the presence of a solid heat-resistant catalyst to form the desired 6-alkyl-alpha-pyrone.

More specifically, the process using the reaction intermediates of our invention comprises the steps of:

i. reacting an alkyl-3-butenoate ester having the formula:

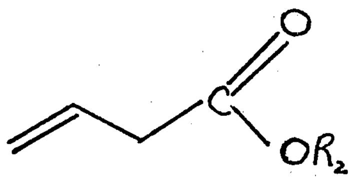

with an acyl halide having the formula:

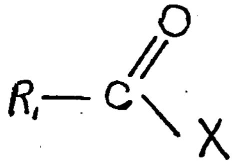

in the presence of a Friedel-Crafts catalyst to form a novel mixture of two keto-esters having the formulae:

(A) 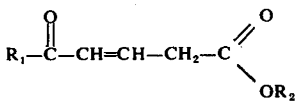

and (B) 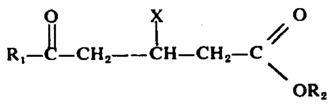

ii. lactonizing this mixture of keto-esters at temperatures of from about 450°C up to about 600°C in the presence of a solid, heat-resistant catalyst (such as copper, stainless steel, nickel or stone) to form the desired 6-alkyl-alpha-pyrone having the formula:

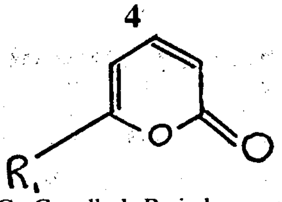

wherein $R_1$ is $C_1$–$C_{10}$ alkyl, $R_2$ is lower alkyl and X is chloro or bromo.

Insofar as the Friedel-Crafts reaction is concerned, examples of alkyl-3-butenoate ester reactants are as follows:

methyl-3-butenoate
ethyl-3-butenoate
i-propyl-3-butenoate
n-propyl-3-butenoate
n-butyl-3-butenoate
i-butyl-3-butenoate
t-butyl-3-butenoate
n-amyl-3-butenoate
1(2-methyl-butyl)-3-butenoate Examples of acyl halides useful in producing the desired mixture of keto-esters (which are then lactonized to yield the desired 6-alkyl-alpha-pyrones) are as follows:

acetyl chloride
acetyl bromide
propionylchloride
propionylbromide
n-butyryl chloride
n-butyryl bromide
2-methylpropionyl bromide
2-methylbutyryl chloride
2-methylbutyryl bromide
3-methylbutyryl chloride
3-methylbutyryl bromide
n-pentanoyl chloride
n-pentanoyl bromide
n-hexanoyl chloride
n-hexanoyl bromide
n-heptanoyl chloride
n-heptanoyl bromide
3-methylheptanoyl chloride
4-methylheptanoyl bromide
5-methylheptanoyl chloride
2-ethylheptanoyl chloride
3-ethylheptanoyl chloride
4-ethylheptanoyl chloride
n-octanoyl bromide
n-octanoyl chloride
2-methyloctanoyl chloride e
2,4-dimethyloctanoyl chloride
2,4-dimethyloctanoyl bromide
2,5-dimethyloctanoyl chloride
2,5-dimethyloctanoyl bromide
n-nonanoyl chloride
n-decanoyl chloride
n-decanoyl bromide The most preferred alkyl-3-butenoate, in view of its ease of synthesis and commercial availability, is methyl-3-butenoate. Methyl-3-butenoate may be prepared according to German Offenlegungschrift No. 1,936,725 (published July 2, 1970) by means of the following reaction:

$$CH_2{=}CH{-}CH_2Cl \xrightarrow[\text{in presence of } Ni(CO)_4 \text{ and } (H_2N)_2C{=}S]{\text{MeOH, CO at 20° and pH 7.5–8}} CH_2{=}CH{-}CH_2{-}CO_2Me$$

Methyl-3-butenoate can also be prepared according to Japanese Pat. No. 29,924 (issued Dec. 23, 1968) according to the following reaction:

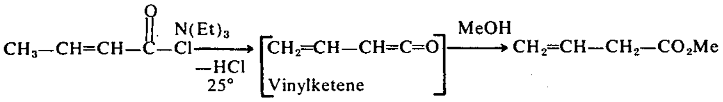

The Friedel-Crafts catalyst used in the first step of our process may be (but is not limited to) one of the following materials:

i. aluminum chloride
ii. aluminum bromide
iii. aluminum iodide
iv. stannic chloride
v. stannic bromide
vi. ferric chloride
vii. ferric bromide
viii. borontrifluoride etherate
ix. borontrifluoride Preferably, the weight ratio of catalyst:alkyl-3-butenoate reactant is from 1:1 up to 2. Lesser quantities of Friedel-Crafts catalyst give rise to incomplete reaction and/or an inordinately long time of reaction and too great a quantity of Friedel-Crafts catalyst gives rise to difficulties in controlling the reaction.

The Friedel-Crafts reaction is most preferably carried out in a solvent which does not take part in the reaction such as methylene dichloride or dichloroethane; but the reaction does not require such a solvent.

When using a reaction solvent, the combined concentration of reactants (e.g., alkyl-3-butenoate and acyl halide) is preferably between 200 and 800 g per liter of solvent.

The mole ratio of acyl halide reactant to alkyl-3-butenoate reactant is preferably 1:1; however, if excess reactant is to be used, it should be the alkyl-3-butenoate that is used in excess.

The molar concentration of reactants in the solvent is from 4 moles per liter up to 10 moles per liter with a preferred concentration of 6 moles per liter.

The temperature of reaction when using a solvent is preferably the reflux temperature of the solvent at atmospheric pressure. Thus, for example, when methylene chloride is used the reflux temperature of 42°C. When dichloroethane is used, the reflux temperature is 90°C. When no solvent is used in the reaction system, the reflux temperature is about 100°C.

The time of reaction varies from about 2 hours up to about 6 hours, depending upon the presence and nature of the solvent and concentration of catalyst used, with higher concentrations of catalyst giving rise to shorter times of reaction and low concentrations of catalyst giving rise to longer times of reaction. By the same token, higher temperatures of reaction gives rise to lower periods of reaction, and lower temperatures of reaction gives rise to longer periods of reaction. Higher temperatures of reaction may be achieved by carrying out the reaction at pressures greater than atmospheric.

The mixture of keto-esters, if desired, may be separated prior to lactonization, by use of such physical separation operations as distillation, preparative gas chromotography and the like. Insofar as the second step (the lactonization) of our process is concerned, the crude reaction mass comprising the two keto-esters or one of the component keto-esters thereof, having the formulae:

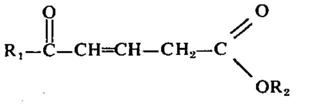

and

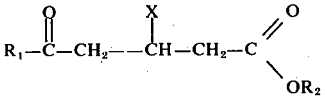

is preferably, but not necessarily, first diluted with an inert solvent (e.g., benzene, cyclohexane, n-hexane or acetic acid) and is then contacted at a temperature in the range of 450°C–600°C. in an inert atmosphere, preferably, a nitrogen atmosphere, with a solid, heat resistant catalyst such as copper, stainless steel, nickel or stone, the catalyst remaining in the solid state over the reaction temperature range. Preferably, the crude reaction mass comprising the two keto-esters or one of the component keto-esters thereof, is passed under an inert atmosphere through equipment, preferably equipment as is illustrated in FIG. 1, which includes one or more columns which is (are) constructed of a material which has high heat resistance and a high heat transfer coefficient (preferably quartz or metal) packed with a solid heat-resistant catalyst such as copper, steel, nickel or stone, which catalyst remains in the solid state over the reaction temperature range. A protruded copper packing catalyst is preferred over steel, nickel or stone packing catalysts.

As reaction surfaces for the purposes of carrying out the lactonization reaction, one or more tubes or other hollow vessels fabricated with or without baffles on the inner surface(s) thereof, constructed of high heat resistant materials having high heat transfer coefficients (e.g., copper, nickel and stainless steel) may also be used.

The lactonization reaction is preferably carried out at essentially atmospheric pressure; however, pressures greater than or less than atmospheric pressure may also be used. The relevant reaction variable ranges for the lactonization reaction are as follows:

| Variable | Range |
|---|---|
| Concentration range of keto-ester to reactant in solvent | 200–500 gm/liter |
| Mass flow rate of keto-ester through catalyst bed per pass | 10–100 gm/hour/pass |
| Number of passes through catalyst bed | 1–4 |

It is noteworthy that efforts to carry out the lactonization in the case of producing 6-alkyl-alpha-pyrones which have no other ring substituents, in the presence of acetic acid solution with a mineral acid catalyst will not succeed with any appreciable yield (of 6-alkyl-alpha-pyrone) where the reaction is attempted to be carried out at the reflux temperature of the reaction mixture at atmospheric pressure.

The following reaction illustrates the process of using the reaction intermediates of our invention:

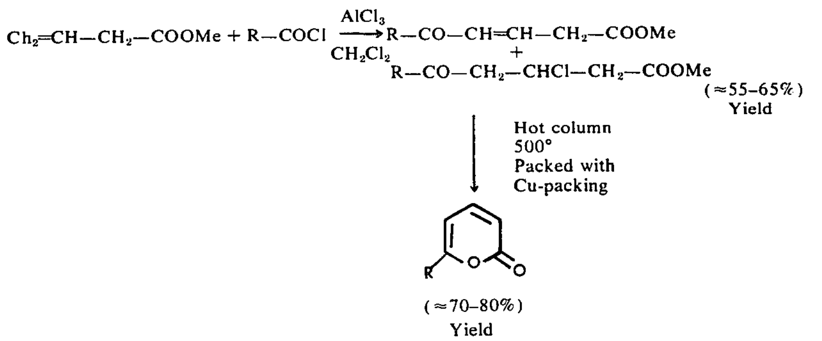

wherein R is alkyl.

The following table indicates the 6-alkyl-alpha-pyrone produced using various acyl halide reactants: Acyl Halide Reactant 6-Alkyl-Alpha-Pyrone Product n-butyryl chloride 6-propyl-alpha-pyrone n-pentanoyl chloride 6-butyl-alpha-pyrone 3-methylbutyryl chloride 6-isobutyl-alpha-pyrone n-heptanoyl chloride 6-hexyl-alpha-pyrone n-octanoyl chloride 6-heptyl-alpha-pyrone Example I, following, serves to illustrate the low efficiency of the prior art reaction of Lohaus et al in the preparation of alpha-pyrones substituted only with a 6-alkyl group. Examples II, III and VII, following, serve to illustrate embodiments using the compositions of matter of our invention as it is now preferred to practice it. Examples IV – VI illustrate the utility of one of the products of the aforementioned process. It will be understood that these examples are illustrative and the invention is to be considered restricted thereto only as indicated in the appended claims.

EXAMPLE I

A. To a suspension of 26.5 g (0.2 moles) of aluminum chloride in 50 cc of dichloroethane is added a solution of 13.5 g (0.1 moles) of hexanoyl chloride and 10.0 g (0.1 moles) of methyl crotonate. Over a period of 10 minutes the temperature rises from 25 to 60°C. The reaction mass is refluxed for 4 hours at a temperature of approximately 90°C. The resultant methyl-5-oxo-decenoate is formed only in a small amount (approximately 2–3%).

B. To a solution of 52.0 g (0.2 moles) of stannic chloride in 50 cc of dichloroethane is added a solution of 13.5 g (0.1 moles) of hexanoyl chloride and 10.0 g (0.1 moles) of methyl crotonate over a period of 10 minutes. The temperature rises from 25°–40°C. The reaction mass is refluxed for 4 hours at approximately 90°C. The resultant yield of methyl-5-oxo-decenoate is approximately 5%.

C. To 29 g (0.2 moles) of 98% borontrifluoride etherate is added a solution consisting of 7.0 g (0.1 moles) of methyl crotonate and 13.4 g (0.1 moles) of hexanoyl chloride. The resulting solution is then heated at approximately 90°C for 2 hours, and then added to ice water. No product is formed, as indicated by GLC analysis.

EXAMPLE II

A. Preparation of Methyl-5-oxo-3-decenoate According to the Reaction:

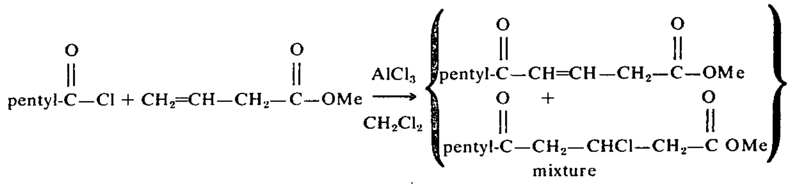

A 5-liter reaction flask equipped with stirrer, thermometer, dropping funnel and reflux condenser is purged with nitrogen. 1,200 cc of dichloromethane and 800 g of aluminum chloride is placed in the reaction vessel and the suspension is stirred vigorously. From the dropping funnel, a solution consisting of 300 g of methyl-3-butenoate and 405 g of hexanoyl chloride is slowly added so that a mild reflux (approximately 42°C) is maintained. This reaction step is exothermic and requires cooling. When the addition is complete (approximately 60 minutes), the resulting solution is refluxed for three (3) hours. The reaction mass is then cooled and carefully decomposed by pouring the reaction mass into excess ice water. The entire reaction mass is then transferred to a separatory funnel and the lower organic layer is collected. The aqueous phase is then extracted with two 500 cc portions of dichloromethane. The organic layers are combined and dried over anhydrous magnesium sulfate. The dried organic layers are then filtered and evaporated, yielding a crude product, a dark brown oil, weighing 610 g, the mole ratio of ester having the formula:

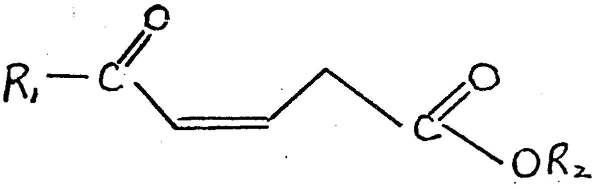

to ester having the formula:

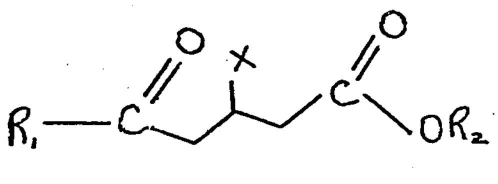

being about 55:45. The actual ratio of these keto-esters varies according to the reaction parameters.

B. Lactonization to Form 6-Pentyl-alpha-pyrone

Reaction:

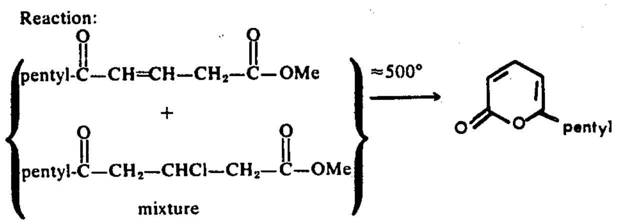

In FIG. 1 is illustrated the apparatus whereby the lactonization is carried out. This apparatus consists of a Lindberg-Hevi-Duty Tube furnace equipped with Quartz tube (24 × ¼ inches) 10 packed with protruded copper packing (0.24 inch) 11. The tube furnace is arranged in a vertical position. A dropping funnel 12 which is to contain the reactant, a nitrogen supply 14 and a separatory funnel 15, which is to receive the reaction product, to which a condenser 16 is attached is also part of the equipment.

From the dropping funnel 12 a previously prepared solution 13 of 1,000 cc benzene and 610 g crude keto-ester mixture prepared according to Part A of this example is passed through the Quartz tube 10 maintained at 490°C ± 5°C over a period of 6–7 hours. The reaction product is collected in the separatory funnel 15.

The reaction product is then successively washed with water, saturated sodium bicarbonate solution and then water again. After drying over anhydrous sodium sulfate the solvent is evaporated and the resulting residue after the addition of 20 g of Primol (Note 1) is distilled using a 2 inch splash column. The following distillation fractions are obtained:

| No. | Vapor Temp. (°C) | Liquid Temp. (°C) | Vac. mm Hg | Weight (g) |
|---|---|---|---|---|
| 1 | 42/60 | 75/92 | 15.0/5.0 | 23.0 discard |
| 2 | 72 | 102 | 5.0 | 7.5 |
| 3 | 95 | 105 | 1.2 | 6.5 |
| 4 | 95 | 105 | 1.2 | 5.2 |
| 5 | 97 | 107 | 1.2 | 9.0 |
| 6 | 97/120 | 107/140 | 1.0 | 211.0 |
| 7 | 130 | 155 | 1.0 | 4.5 |
| Residue: 31.5 g | | | | |

Note 1:
Primol is a registered trademark of Exxon Corporation of Linden, New Jersey used to identify white Mineral Oil having a specific gravity of approximately 0.9 and a boiling point of approximately 975°F.

Fractions 3–7 (237.2 g) are bulked for distillation using an 18 inch silver mirrored distillation column with Goodloe packing. The resultant 6-n-pentyl-alpha-pyrone distills at 92°–103° at 0.5 mm Hg., and then re-distilled yielding the following fractions:

| Fraction No. | Vapor Temp. (°C) | Liquid Temp. (°C) | Vac. mm | Weight (g) | Reflux Ratio | Purity |
|---|---|---|---|---|---|---|
| 1 | 85/89 | 122/124 | 0.5 | 2.8 | 1:19 | — |
| 2 | 90 | 127 | 0.5 | 4.2 | 1:19 | — |
| 3 | 90 | 127 | 0.5 | 4.8 | 1:19 | — |
| 4 | 90 | 127 | 0.5 | 4.8 | 1:19 | 85% |
| 5 | 91 | 130 | 0.5 | 9.3 | 1:19 | 90 |
| 6 | 92 | 130 | 0.5 | 8.8 | 1:19 | 92 |
| 7 | 92 | 130 | 0.5 | 17.8 | 1:9 | 95 |
| 8 | 92 | 131 | 0.5 | 29.1 | 1:4 | 95 |
| 9 | 92 | 131 | 0.5 | 22.6 | 1:4 | 95 |
| 10 | 92 | 132 | 0.5 | 26.0 | 1:4 | 95 |
| 11 | 92 | 136 | 0.5 | 13.3 | 1:9 | 95 |
| 12 | 92 | 139 | 0.5 | 14.3 | 1:9 | 95 |
| 13 | 92 | 143 | 0.5 | 12.8 | 1:19 | 95 |
| 14 | 92 | 163 | 0.5 | 12.4 | 1:19 | 90 |
| 15 | 92 | 180 | 0.5 | 5.1 | 1:19 | 85 |
| 16 | 96 | 192 | 0.5 | 5.5 | 1:19 | — |
| 17 | 102 | 206 | 0.5 | 3.7 | 1.:19 | — |
| 18 | 110 | 230 | 0.5 | 1.2 | 1:19 | — |
| Residue: 5.0 g | | | | | | |

Analysis:

Fr. 1–3 = 11.8 g contains 6-pentyl-alpha-pyrone and low boiling impurities.

Fr. 4–15 = 176.3 g is 6-pentyl-alpha-pyrone (95%) with an impurity of methyl-5-oxo-3-decenoate (3.4%).

Fr. 16–18 = 9.4 g consists predominately of methyl-5-oxo-3-decenoate and small amounts of 6-pentyl-alpha-pyrone.

Mass Spectral, Infra-Red and NMR Analyses:

MS: m/e (%) 95(100), 110(51), 39(47), M166(41), 81(39), 82(30).

IR: $cm^{-1}$ 1740 and 1725 split C═0 absorptions. 1635 and 1555 C=C stretching bands.

NMR: ppm proton assignment

| | |
|---|---|
| a. | 0.94 |
| c.=b. | 1.34 |
| d. | 1.64 |
| e. | 2.48 |
| f. | 5.83 |
| g. | 6.0 |
| h. | 7.19 |

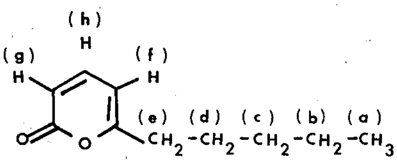

This material has an intense, coconut, peach-like lactonic odor with green floral nuances.

EXAMPLE III

Synthesis of 6-n-Heptyl-alpha-pyrone According to the Reaction:

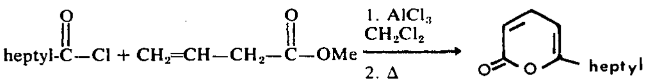

To a stirred suspension of 67 g of aluminum chloride in 150 cc dichloromethane at room temperature, a mixture of 25 g of methyl-3-butenoate and 40.5 g of octanoyl chloride is added during a period of 30 minutes while maintaining the reaction temperature at 20°–25°C with external cooling. The resulting solution is refluxed for a period of 2.5 hours. The resulting brown reaction product is then decomposed by pouring same into excess ice-water mixture. The organic layer is collected and the aqueous phase is extracted with two 250 cc portions of diethyl ether. The combined organic layers are then washed with saturated salt solution and dried over anhydrous magnesium sulfate. The solvent is then evaporated and the residual oil weighing 82.5 g is diluted to a volume of 150 cc with cyclohexane and placed in the dropping funnel 12. The resulting solution is passed dropwise through a Quartz column 10 packed with 0.24 inch of protruded copper packing 11, in the apparatus as set forth in FIG. 13 heated to 500°C over a period of approximately 90 minutes. The reaction product, recovered in separatory funnel 15 is then evaporated using a Buchi evaporator (10 mm Hg/75°C) and then the resulting residue is distilled under reduced pressure employing a short path column according to the following distillation:

| No. | Vapor Temp. (°C) | Liquid Temp. (°C) | Vacuum mm Hg | Weight (g) |
|---|---|---|---|---|
| 1 | 35/53 | 65/110 | 3.0 | 5.2 |
| 2 | 150 | 190 | 3.0 | 27.4 |

Fraction 2 is then re-distilled using a micro Vigreaux column according to the following distillation data:

| No. | Vapor Temp. (°C) | Liquid Temp. (°C) | Vacuum mm Hg | Weight (g) |
|---|---|---|---|---|
| 1 | 80/83 | 105/119 | 1.8 | 0.6 |
| 2 | 85 | 126 | 1.5 | 0.6 |
| 3 | 92 | 128 | 1.5 | 0.5 |
| 4 | 119 | 131 | 1.5 | 0.8 |
| 5 | 122 | 133 | 1.5 | 1.4 |
| 6 | 122 | 134 | 1.5 | 2.0 |
| 7 | 122 | 135 | 1.5 | 4.3 |
| 8 | 122 | 135 | 1.5 | 3.9 |
| 9 | 122 | 137 | 1.5 | 4.6 |
| 10 | 122 | 141 | 2.0 | 3.2 |
| 11 | 122 | 143 | 2.0 | 1.7 |

NMR, GLC, IR and mass spectral analyses confirm that the resultant material is n-heptyl-alpha-pyrone.

Mass Spectral, Infra-Red and NMR Analyses:

MS: m/e (%) 95(100), 39(75), 110(52), 27(38), 82(36), 41(35), M194(17).

IR: $cm^{-1}$ 1740 and 1725 split C=O absorptions. 1635 and 1555 C=C stretch bands.

NMR: ppm proton assignment

| | |
|---|---|
| a. | 0.86 |
| e.=d.=c.=b. | 1.3 |
| f. | 1.64 |
| g. | 2.46 |
| h. | 5.95 |
| i. | 6.08 |
| j. | 7.23 |

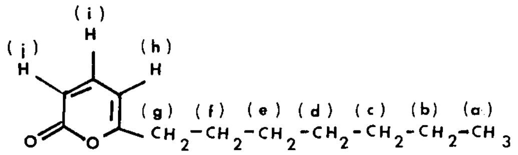

This material has a fatty, fruity aroma.

EXAMPLE IV

Woody, Aphrodesia Perfume Formulation

The following mixture is prepared:

| Ingredient | Parts by Weight |
|---|---|
| Vanillin | 2 |
| Myrrh Coeur | 3 |
| Olibanum Coeur | 3 |
| Resin Absolute Labdanum | 3 |
| Methyl ester of 3,6-dimethyl resorcylic acid | 5 |
| Mixture containing primarily methyl-2,6,10-trimethyl-2,5,9-dodecatrien-1-yl-ketone, produced according to the process of Example I of Canadian Patent 864,592 | 50 |
| Cedryl methyl ether having the structure: 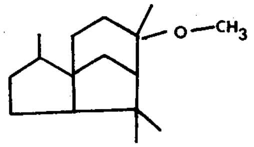 | 20 |
| 4-(4-methyl,4-hydroxyamyl)$\Delta^3$-cyclohexene carboxaldehyde | 20 |
| Ylang Extra | 5 |
| p-t-butyl cyclohexyl acetate (27% "cis" isomer) | 30 |
| Indol | 1 |
| Gamma Methyl Ionone | 35 |
| Jasmine Absolute | 5 |
| Rose Absolute | 3 |
| Eugenol | 15 |
| Isoeugenol | 10 |
| 3-Norbornyl-cyclohexanol | 10 |
| 6-oxa-1,1,2,3,3,8-hexamethyl-2,3,5,6,7,8-hexahydro-1H-benz(f) indene | 50 |
| 6-n-butyl-alpha-pyrone | 15 (6.7% of formulation) |
| 6-n-pentyl-alpha-pyrone | 5 |

The 6-n-butyl-alpha-pyrone imparts a floral, sweet character to this woody, aphrodesia perfume formulation. The 6-n-pentyl-alpha-pyrone imparts a green, coconut, tobacco note to this woody, aphrodesia perfume formulation.

EXAMPLE V

Preparation of Soap Composition

One hundred grams of soap chips are mixed with one gram of the perfume composition of Example IV until a substantially homogeneous composition is obtained. The perfumed soap composition manifests an excellent blue grass character with lovage, foenugreek notes.

EXAMPLE VI

Preparation of a Detergent Composition

A total of 100 grams of a detergent powder is mixed with 0.15 grams of the perfume composition of Example IV until a substantially homogeneous composition is obtained. This composition has an excellent blue grass odor with a lovage, foenugreek note.

EXAMPLE VII

Preparation of 6-Pentyl-alpha-pyrone using various Heat Resistant Solid Catalysts A. Use of Saddle Stones 50 g of ester mixture prepared according to the process of Example II (A) is treated in an apparatus illustrated in FIG. 1 as follows. 50 g of ester mixture is diluted with cyclohexane to a volume of 150 cc. The mixture is passed through a quartz column 10 at 495°C over a period of 120 minutes. After solvent recovery, 44.8 g of a mixture of ester and 6-pentyl-alpha-pyrone is recovered, the mole ratio of ester:lactone being (67.5):(32.5) by gc area normalization.

B. Use of Stainless Steel Protruded Packing (0.24 inch Type 316 Stainless Steel) as Catalyst 50 g of ester mixture prepared according to the process of Example II (A) is diluted with cyclohexane to 150 cc. The solvent is passed through the apparatus illustrated in FIG. 1. The first pass is over a period of 1 hour at 490°–495°C yielding 135 cc of a solution in which mole ratio of ester:lactone is 30.5:69.5. The second pass over a period of 1 hour at 490°–495°C yields 27 g of crude product after solvent evaporation having an ester:lactone ratio of 8:92 by gas chromatographic analysis.

C. Use of Stainless Steel Protruded Packing (0.24 inch Type 316 Stainless Steel) as Catalyst 50 g of ester mixture prepared according to the process of Example II (A) is diluted with acetic acid to 150 cc. The first pass through the quartz tube 10 over a period of 1 hour at 490°–495°C yields a material having an ester:lactone ratio of 19:81. The second pass yields 16.9 g of crude lactone after solvent evaporation, the 6-n-pentyl-alpha-pyrone having purity of greater than 95%.

D. Use of Nickel Packing Catalyst (0.26 inch)

100 g of the ester mixture prepared in Example II (A) is diluted to 300 cc with hexane. Over a period of 4 hours, the solution is passed through quartz tube 10 in the apparatus illustrated in FIG. 1. The resultant crude material has by gc analysis an ester:lactone mole ratio of 25:75. Final yield of distilled 6-pentyl-alpha-pyrone is 46.5 g.

E. Use of Stainless Steel Packing (0.26 inch) Catalyst 100 g of ester mixture prepared according to the process of Example II (A) is diluted with cyclohexane to 300 cc. The resulting solution is passed through the quartz column 10 of FIG. 1 over a period of 4 hours, the resultant solution (240 cc) on evaporation yielding 80.5 g of a brown residual oil. Fraction 3 of the product (64.5 g, containing 85% lactone and 15% ester) is distilled to give an 80% yield of 6-pentyl-alpha-pyrone.

What is claimed is:

1. A mixture consisting essentially of of a first keto-ester having the formula:

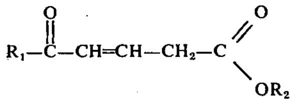

and a second keto-ester having the formula:

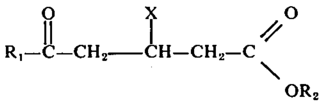

wherein $R_1$ is $C_1$–$C_{10}$ alkyl, $R_2$ is lower alkyl and X is chloro or bromo.

2. The mixture of claim 1 wherein $R_1$ is n-pentyl.

3. The mixture of claim 1 wherein $R_2$ is methyl.

4. The mixture of claim 1 wherein X is chlorine.

5. The mixture of claim 1 wherein $R_1$ is n-pentyl, $R_2$ is methyl and X is chlorine.

6. The mixture of claim 5 wherein the mole ratio of first keto-ester:second keto-ester is 55:45.

7. A mixture consisting essentially of i. a first keto-ester having the formula:

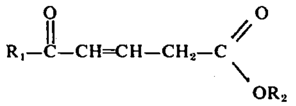

ii. a second keto-ester having the formula:

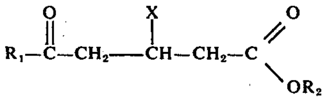

and iii. an inert solvent selected from the group consisting of benzene, cyclohexane, n-hexane and acetic acid; wherein R, is $C_1$–$C_{10}$ alkyl, $R_2$ is lower alkyl and X is chloro or bromo.

8. The mixture of claim 7 wherein the mole ratio of said first keto ester: said second keto ester is 55:45.

* * * * *